C. W. DRAKE.
GRIPPING TOOL.
APPLICATION FILED SEPT. 26, 1919.

1,366,122.

Patented Jan. 18, 1921.

Inventor
C. W. Drake.

By
Attorneys

UNITED STATES PATENT OFFICE.

CHARLES W. DRAKE, OF BURKBURNETT, TEXAS.

GRIPPING-TOOL.

1,366,122. Specification of Letters Patent. Patented Jan. 18, 1921.

Application filed September 26, 1919. Serial No. 326,595.

*To all whom it may concern:*

Be it known that I, CHARLES W. DRAKE, a citizen of the United States, residing at Burkburnett, in the county of Wichita and State of Texas, have invented new and useful Improvements in Gripping-Tools, of which the following is a specification.

The tool which is the subject matter of the present application for patent has been designed for gripping well tubing and other round work, and the invention has for its object to provide a very simple, strong and efficient tool of this kind in which the work-engaging jaws are automatically made to grip and to release the work by a swinging handle or shank, the jaws taking hold when the handle is swung in a direction to rotate the work, and releasing when the handle is swung in the opposite direction.

The object stated is attained by means of a novel combination and arrangement of parts to be hereinafter described and claimed, and in order that the same may be better understood, reference is had to the accompanying drawing, forming a part of this specification.

Figure 1:
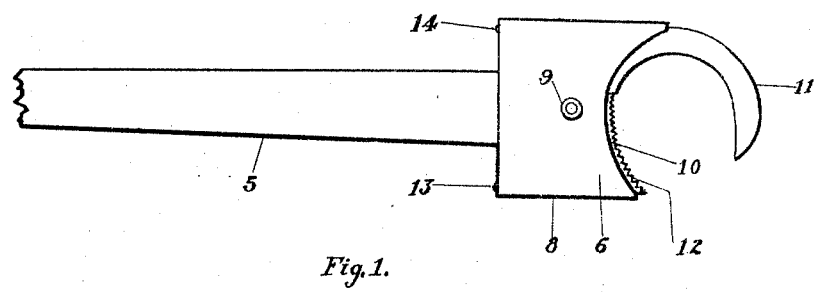
Figure 1 is a plan view of the tool.
Figure 2:
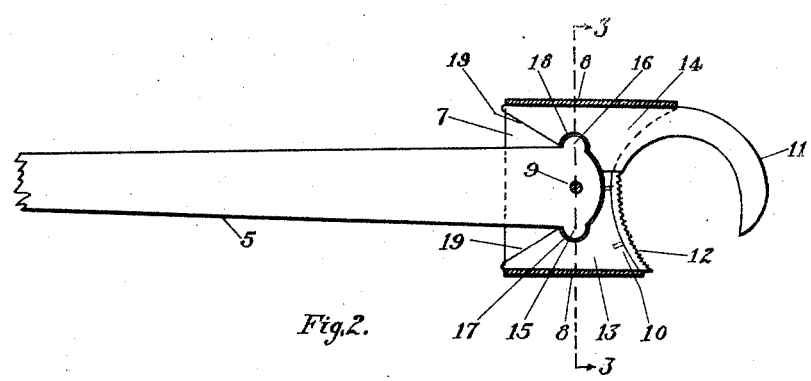
Fig. 2 is a similar view partly in section.
Figure 3:
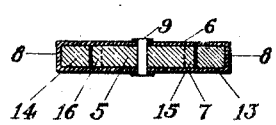
Fig. 3 is a cross section on the line 3—3 of Fig. 2.

Referring specifically to the drawing, 5 denotes a handle or shank of suitable length and strength to successfully withstand the strain to which the tool may be subjected when in use. At its forward end, the handle 5 is inclosed in a housing composed of a top 6, a bottom 7 and sides 8. The handle is pivotally connected to the housing by a pin or bolt 9 passing through the former and through the top and the bottom walls of the latter.

The tool has slidable inner and outer jaws 10 and 11, respectively. The outer jaw has the shape of a hook extending transversely of the tool, and the work-engaging side of the hook is the concave side thereof facing the inner jaw. The work-engaging face of the inner jaw is also made slightly curved, which, together with the curvature of the outer jaw adapts the tool more particularly for round work, it being designed especially for a break-out tongs to be used on a rotary well drilling rig. It will be understood however, that the tool is not limited to such use, but may be used for any work requiring a tool of the pipe tongs type.

The inner jaw 10 is fitted with a removable facing 12 which is serrated to obtain a firm grip on the work. When this facing becomes worn or dulled, it can be taken off and a new facing put in its place.

The inner jaw 10 has a shank 13 which is positioned opposite one side of the handle 5 at the outer end of the latter, and on the other side of the handle is located the shank 14 of the outer jaw 11. The jaw 11 extends partly across the outer end of the handle 5 and meets the inner edge of the shank 14, these meeting parts being flat and extending parallel to the longitudinal axis of the tool.

Close to the outer end of the handle 5, the latter has laterally extending, rounded lugs 15 and 16, respectively, one lug being on one side of the handle and the other lug on the other side. The inner edges of the jaw shanks 13 and 14 which are contiguous to the side edges of the handle have recesses in which the lugs 15 and 16 loosely seat, the recess of the shank 13 being shown at 17 seating the lug 15, whereas the recess 18 of the shank 14 seats the lug 16. To the rear of the lugs, the shanks 13 and 14 are beveled as shown at 19 to recede from the edges of the handle, so that the latter is free to be swung about the pivot 9 without interference by the jaw shanks. The outer edges of the jaw shanks are flat and slidably seat against the inner faces of the side walls 8 of the housing.

The lugs 15 and 16 are on opposite sides of the fulcrum or pivot 9 of the handle 5, and hence it will be seen that when the handle is swung in one direction, the inner jaw 10 is slid forwardly and the outer jaw is drawn inwardly. The jaws thus close up around the work and grip the same. When the handle is swung in the opposite direction, the inner jaw moves inwardly and the outer jaw moves outwardly, and as the jaws now spread, the work is released. The side walls 8 guide the jaws during both movements, and prevent the same from spreading in a transverse direction.

The tool is simple and strong, it can be readily applied to the work and removed therefrom, and the work is tightly gripped.

The greater the power applied to the handle in a direction to close the jaws, the greater will be the grip exerted on the lattter.

I claim:

A gripping tool comprising a handle, a housing into which the handle extends and to which it is pivoted, and slidable inner and outer jaws having their work engaging faces curved and extending transversely of the longitudinal axis of the tool, said jaws having shanks extending into the housing and positioned on opposite sides of the handle, the outer edges of the shanks being in sliding contact with the side walls of the housing, and their inner edges having recesses, the handle having outstanding lugs on opposite sides of its pivot seating loosely in the recesses, and said shanks ahead of the recesses extending tranversely of the forward end of the handle in proximity thereto and terminating in inner edge portions which are in sliding contact with each other.

In testimony whereof I affix my signature.

CHARLES W. DRAKE.